United States Patent
Peter et al.

(10) Patent No.: US 11,615,795 B2
(45) Date of Patent: Mar. 28, 2023

(54) METHOD AND SYSTEM FOR PROVIDING SECURED ACCESS TO SERVICES RENDERED BY A DIGITAL VOICE ASSISTANT

(71) Applicant: HCL America Inc., Sunnyvale, CA (US)

(72) Inventors: Jose Peter, NSW (AU); Ryan Alexander Davis, Raleigh, NC (US)

(73) Assignee: HCL America Inc., Sunnyvale, CA (US)

( * ) Notice: Subject to any disclaimer, the term of this patent is extended or adjusted under 35 U.S.C. 154(b) by 220 days.

(21) Appl. No.: 16/945,992

(22) Filed: Aug. 3, 2020

(65) Prior Publication Data

US 2022/0036894 A1 Feb. 3, 2022

(51) Int. Cl.
*G10L 15/22* (2006.01)
*G06F 21/60* (2013.01)
*G10L 15/30* (2013.01)

(52) U.S. Cl.
CPC ............ *G10L 15/22* (2013.01); *G06F 21/604* (2013.01); *G10L 15/30* (2013.01); *G10L 2015/223* (2013.01)

(58) Field of Classification Search
USPC .................................................... 704/1–504
See application file for complete search history.

(56) References Cited

U.S. PATENT DOCUMENTS

| | | | |
|---|---|---|---|
| 7,177,814 B2* | 2/2007 | Gong | H04M 3/4936 704/270.1 |
| 8,121,845 B2 | 2/2012 | Kirby | |
| 9,374,451 B2* | 6/2016 | Salmenkaita | H04M 3/4938 |
| 9,697,822 B1* | 7/2017 | Naik | G10L 15/22 |
| 10,438,594 B2 | 10/2019 | Miller | |
| 10,559,296 B2 | 2/2020 | Lewis et al. | |
| 10,580,405 B1 | 3/2020 | Wang et al. | |
| 10,748,529 B1* | 8/2020 | Milden | G06F 3/167 |
| 11,157,075 B2* | 10/2021 | Cox | G06F 3/03547 |
| 2004/0176958 A1* | 9/2004 | Salmenkaita | H04M 1/72457 704/275 |

(Continued)

OTHER PUBLICATIONS

Conor Allison, "How to use Voice Match to set up multiple user profiles on Google Home".

(Continued)

*Primary Examiner* — Marcus T Riley

(57) ABSTRACT

Method and system for providing secured access to services rendered by digital voice assistants are disclosed. In an example, the method includes generating, by the digital voice assistant in a set-up mode, hierarchical access levels for a plurality of services rendered by the digital voice assistant, based on an input from a super user. The method further includes generating, by the digital voice assistant in an operational mode and upon receiving a voice command from a user for a first time, a unique voice directive corresponding to the voice command. The unique voice directive comprises language tags and voice tags extracted from the voice command. The method further includes assigning an access level from among the hierarchical access levels to the unique voice directive and rendering a service from among the plurality of services based on the access level and the voice directive.

13 Claims, 4 Drawing Sheets

(56) References Cited

U.S. PATENT DOCUMENTS

| | | | |
|---|---|---|---|
| 2013/0346068 A1* | 12/2013 | Solem | G10L 15/26 704/9 |
| 2014/0167931 A1 | 6/2014 | Lee et al. | |
| 2014/0222436 A1* | 8/2014 | Binder | G10L 21/16 704/275 |
| 2017/0286133 A1* | 10/2017 | Rambhia | G06Q 50/10 |
| 2019/0339769 A1* | 11/2019 | Cox | G06F 3/016 |
| 2020/0365155 A1* | 11/2020 | Milden | G06F 3/167 |
| 2022/0036894 A1* | 2/2022 | Peter | G06F 21/604 |

OTHER PUBLICATIONS

John Patrick Pullen, "This Amazon Echo Tip is Great for Families and Roommates".

\* cited by examiner

METHOD AND SYSTEM FOR PROVIDING SECURED ACCESS TO SERVICES RENDERED BY A DIGITAL VOICE ASSISTANT

TECHNICAL FIELD

Generally, the invention relates to digital voice assistant. More specifically, the invention relates to method and system for providing secured access to services rendered by a digital voice assistant.

BACKGROUND

In current technological world, people are rapidly moving away from textual/graphical interfaces towards voice interfaces. In particular, people have started to leverage digital voice assistants for performing various tasks in addition to or instead of text command interface or graphical user interface (GUI). Digital voice assistants such as AMAZON'S ALEXA, GOOGLE ASSISTANT, AND APPLE'S SIRI have become quite popular because of their ability to respond to natural language and mimic normal human conversations. Moreover, with an integration of these digital voice assistants into smart devices (for example, smartphones, speakers, laptops, and desktops, etc.), users are able to perform a variety of tasks in their day-to-day lives via natural language voice commands. Such tasks include, but are not limited to, searching information on the web, seeking answers to questions, seeking recommendations, managing personal schedules, playing audio/video files, placing shopping order, and controlling smart home functions.

However, the above discussed advancement may be limited in their scope and utility due to concern with respect to security, privacy, unauthorized usage, and so forth. For example, enablement of the voice command on one's digital device to perform daily tasks may allow anyone with an access to that digital device to perform those digital tasks. Therefore, there is a risk of unauthorized or undesired usage of digital voice assistants to perform some of the digital tasks (e.g., placing online order).

SUMMARY OF INVENTION

In one embodiment, a method of providing secured access to services rendered by a digital voice assistant is disclosed. The method may include generating, by the digital voice assistant in a set-up mode, a set of hierarchical access levels for a plurality of services rendered by the digital voice assistant, based on an input from a super user. The method further may include generating, by the digital voice assistant in an operational mode, a unique voice directive corresponding to a voice command from a user upon receiving the voice command for a first time. It should be noted that, the unique voice directive comprises a set of language tags and a set of voice tags extracted from the voice command. The method may further include assigning an access level from among the set of hierarchical access levels to the unique voice directive. The method may further include rendering a service from among the plurality of services based on the access level and the voice directive.

In another embodiment, a digital voice assistant device is disclosed. The digital voice assistant device may include a processor and a memory communicatively coupled to the processor. The memory may store processor-executable instructions, which, on execution, may causes the processor to generate, in a set-up mode, a set of hierarchical access levels for a plurality of services rendered by the digital voice assistant device, based on an input from a super user. The processor-executable instructions, on execution, may further cause the processor to generate, in an operational mode and upon receiving a voice command from a user for a first time, a unique voice directive corresponding to the voice command. It should be noted that, the unique voice directive comprises a set of language tags and a set of voice tags extracted from the voice command. The processor-executable instructions, on execution, may further cause the processor to assign an access level from among the set of hierarchical access levels to the unique voice directive. The processor-executable instructions, on execution, may further cause the processor to render a service from among the plurality of services based on the access level and the voice directive.

In yet another embodiment, a non-transitory computer-readable medium storing computer-executable instruction for providing secured access to services rendered by a digital voice assistant is disclosed. The stored instructions, when executed by a processor, may cause the processor to perform operations including generating, in a set-up mode, a set of hierarchical access levels for a plurality of services rendered by the digital voice assistant, based on an input from a super user. The operations may further include generating, in an operational mode and upon receiving a voice command from a user for a first time, a unique voice directive corresponding to the voice command. It should be noted that, the unique voice directive comprises a set of language tags and a set of voice tags extracted from the voice command. The operations may further include assigning an access level from among the set of hierarchical access levels to the unique voice directive. The operations may further include rendering a service from among the plurality of services based on the access level and the voice directive.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
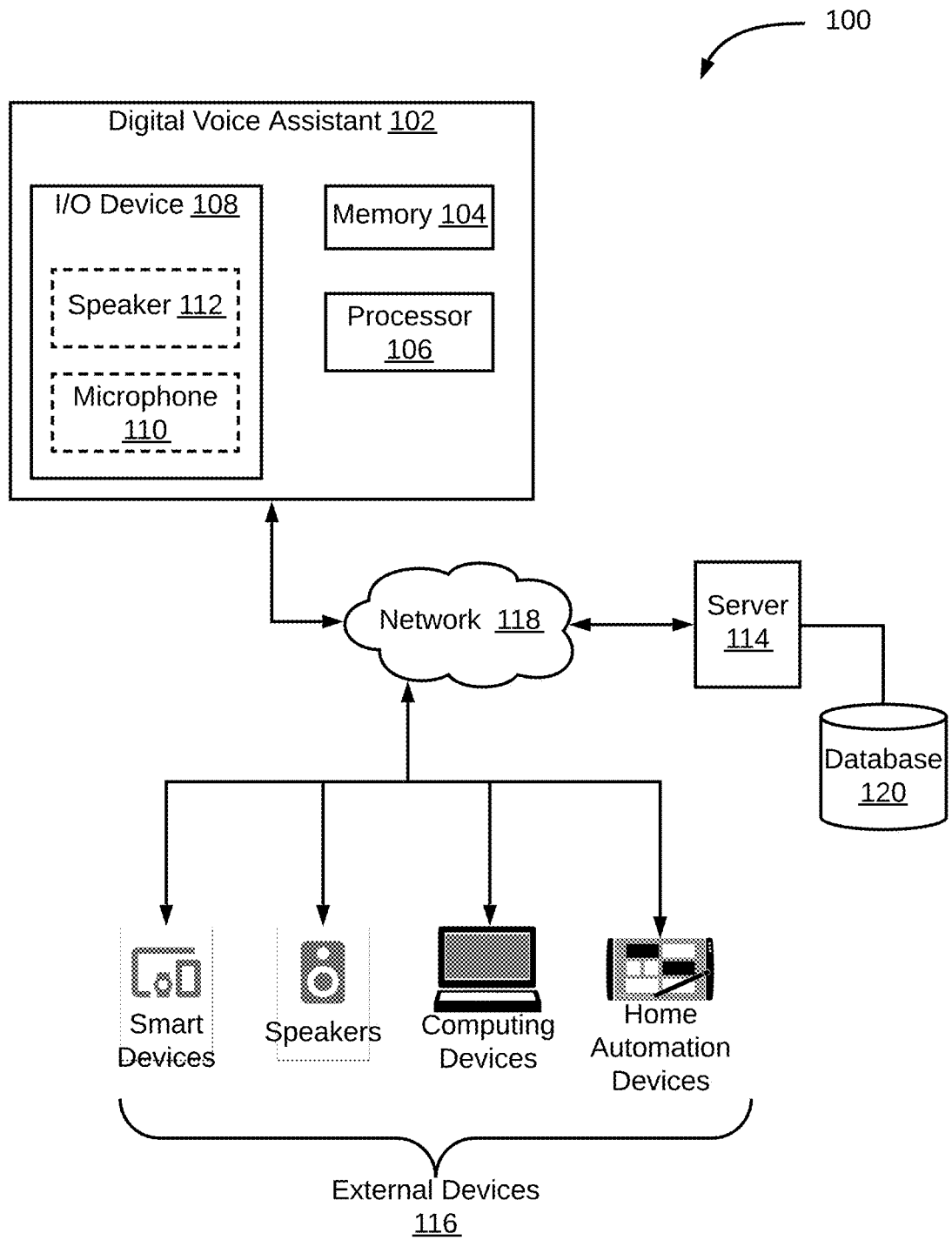
FIG. 1 is a block diagram of an exemplary system for providing secured access to services rendered by a digital voice assistant device, in accordance with some embodiments of the present disclosure.

Referring now to FIG. 1, a block diagram of an exemplary system 100 for providing secured access to services rendered by a digital voice assistant device 102 is illustrated, in accordance with some embodiments of the present disclosure. In particular, the system 100 may include a digital voice assistant device 102 that may provide secured access to services rendered by itself. The digital voice assistant device 102 may provide secured access to services by generating a set of hierarchical access levels for a plurality of services rendered. In an embodiment, the set of hierarchical access levels may include, but may not be limited to, a set of service-based access levels, a set of role-based access levels, a relationship-based access levels, and a set of individual-based access levels. Moreover, the set of hierarchical access level for the plurality of services may be established based on an input received from a super user (e.g., administrator). By way of an example, the super user may correspond to a head of a family or an organization having rights to access all services provided by the digital voice assistant device 102. In addition, the super user may generate the set of hierarchical access level in a set-up mode of the digital voice assistant device 102 (i.e., at the time of initial set-up or subsequently by entering into settings).

Thereafter, as and when the digital voice assistant device 102 receive a voice command from a user in an operational mode, the digital voice assistant may check if the command is from the super user or a normal user. On receiving the voice command from the normal user for a first time, the digital voice assistant device 102 may generate a unique voice directive corresponding to the voice command. The unique voice directive may include a set of language tags and a set of voice tags extracted from the voice command.

Further, once the unique voice directive is generated, the digital voice assistant device 102 may assign an access level from the set of hierarchical access level to the unique voice directive. In an embodiment, the assignment of the access level may be based on an identification of the normal user. It should be noted that the digital voice assistant may establish the identification of the normal user through an interactive dialogue session. Thereafter, based on the access level and the unique voice directive, the digital voice assistant device 102 may render the service from the plurality of services to the user.

In some embodiments, the digital voice assistant device 102 may take the form of or may be implemented in any processor based device (for example, a server, a desktop, a laptop, a notebook, a tablet, a smartphone, a mobile phone, an application server, a smart speaker, etc.) that is capable of acquiring voice commands from user. Example of digital voice assistant device include, but are not limited to, AMAZON ALEXA based device (e.g., AMAZON ECHO, AMAZON ECHO DOT, AMAZON ECHO SHOW, etc.), GOOGLE ASSISTANT (e.g., ANDROID based smartphones, speakers, etc.), APPLE'S SIRI (e.g., iOS based smartphones, iPadOS based computing devices, macOS based devices, etc.), or the like. In particular, the digital voice assistant device 102 may include a memory 104, a processor 106, and an input/output device 108. The input/output device 108 may further include a microphone 110 and optionally a speaker 112. The input/output device 108 may also include other peripherals (for example, display device, volume buttons, etc.) for receiving input and/or providing output. A super user or a user may interact with the digital voice assistant device 102 and vice versa through the input/output device 108.

By way of an example, in some embodiments, the speaker 112 may provide intermediate or final output corresponding to the service rendered to the user. Additionally, the speaker 112 may guide the user during set-up process and/or while accessing a service. Moreover, the speaker 112 may provide alert/notification to user. Similarly, in some embodiments, the display device may be capable of rendering graphical user interface (GUI) that provide intermediate or final output corresponding to the service rendered to the user. Additionally, the GUI may be used to guide the user during set-up process and/or while accessing a service. Moreover, the GUI may provide alert/notification to the user. In some embodiments, the alert/notification may include, but may not be limited to, a notification to the super user about device logs, an alert to the super user and/or the user about an attempt to access restricted service, an alert to the super user about rendering of the restricted service based on the override authorization information, a notification to the super user about current settings of the digital voice assistant device 102, and so forth. Thus, for example, in some embodiment, the digital voice assistant device 102 may ingest the voice command or the input, from one or more users or the super user, via the microphone 110 or the GUI. Moreover, for example, in some embodiments, the digital voice assistant device 102 may provide output corresponding to the ingested voice command or input through the speaker 112 or the GUI.

The memory 104 may store instructions that, when executed by the processor 106, may cause the processor 106 to provide secured access to services rendered by the digital voice assistant device 102, in accordance with some embodiments of the present disclosure. As will be described in greater detail in conjunction with FIG. 2 to FIG. 4, in order to provide secured access to services rendered by the digital voice assistant device 102, the processor 106 may perform various functions including generating the set of hierarchical access level, generation of the unique voice directive, assigning the access level, endering of the service, and so forth.

The memory 104 may also store various data (e.g., the set of hierarchical access levels, the unique voice directives, authorization information, device logs, device settings, rules set by super user, etc.) that may be captured, processed, and/or required by the digital voice assistant device 102. The memory 104 may be a non-volatile memory (e.g., flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.)

Further, in some embodiments, the digital voice assistant device 102 may interact with one or more external devices 116 over a network 118 for rendering various services. Alternatively, digital voice assistant device 102 may notify the super user about the rendering of the service via one of the external devices 116. Moreover, the external devices 116 may be used to give the voice command to the digital voice assistant device 102. The external devices 116 may include, but may not be limited to, a smart device (e.g., a smart television, a smartphone, a smart watch, a fitness tracker, etc.), a computing device (e.g., a desktop, a laptop, a notebook, a netbook, a tablet, etc.), speaker (e.g., a Bluetooth speaker), home automation devices (e.g., a smart switch, a smart appliance, a smart door lock, etc.), and/or another digital devices. Moreover, in some embodiments, the digital voice assistant device 102 may interact with a remote server 114 over the network 118 for sending and receiving various data including those for rendering various services. The network 118, for example, may be any wired or wireless communication network and the examples may include, but may be not limited to, the Internet, Wireless Local Area Network (WLAN), Wi-Fi, Long Term Evolution (LTE), Worldwide Interoperability for Microwave Access (WiMAX), and General Packet Radio Service (GPRS).

In some embodiments, the digital voice assistant device 102 may receive results of the voice command from the server 114. By way of an example, on receiving a voice command from a user to play a song or a video, the digital voice assistant device 102 may request and receive the song/video from the server 114 (e.g., a third-party server) and play the same over the Bluetooth speaker or the smart television respectively. Similarly, for example, the digital voice assistant device 102 may access a news article or a weather report form the server 114 and render it over the speaker 112. Further, for example, the digital voice assistant device 102 may interact with the user to make a shopping list and place a shopping order to the server 114. As will be appreciated, the server 114 may further include a database 120, which may store information (e.g., song, video, news article, weather report, etc.) related to the voice commands received from one or more users on the server 112.

Figure 2:
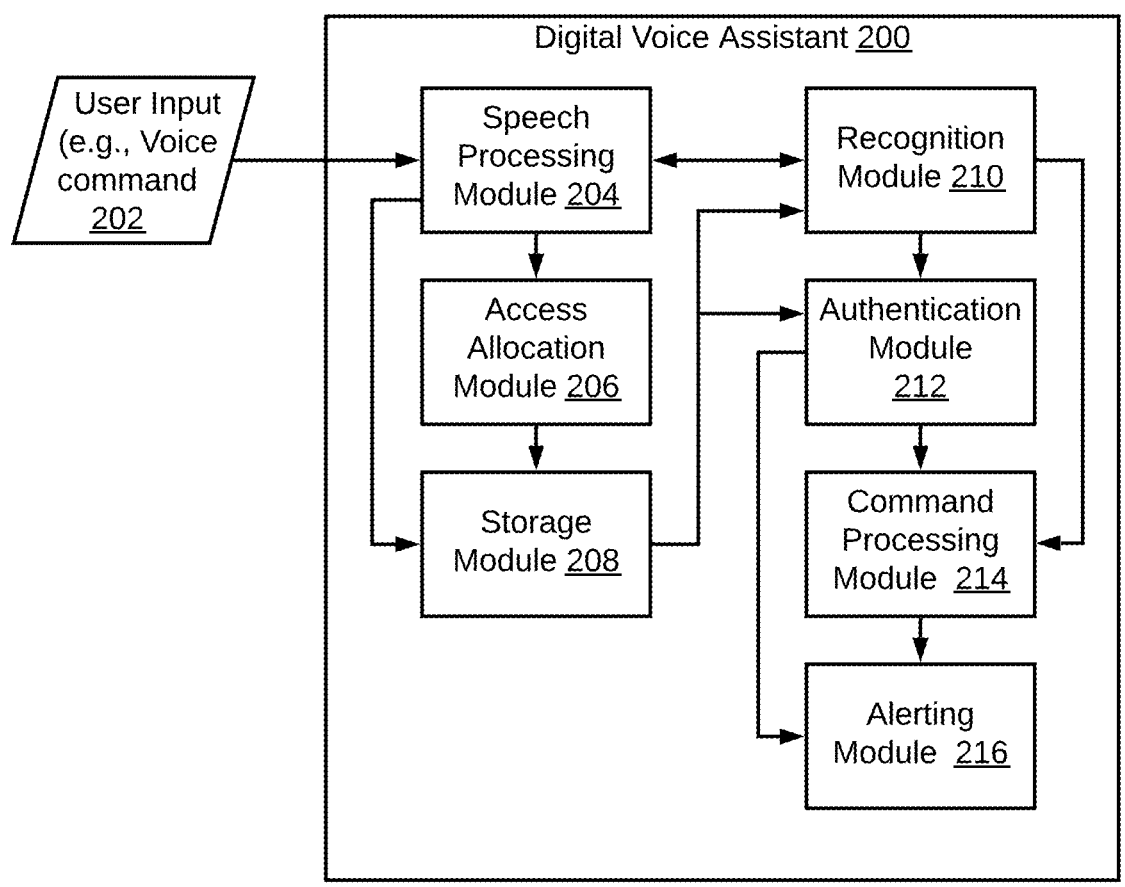
FIG. 2 is a functional block diagram of an exemplary digital voice assistant configured to provide secured access to various services, in accordance with some embodiments of the present disclosure.

Referring now to FIG. 2, a functional block diagram of a digital voice assistant 200 (implemented by the digital voice assistant device 102) configured to provide secured access to various services rendered by the digital voice assistant 200 is illustrated, in accordance with an embodiment. The digital voice assistant 200 may receive a user input 202 (e.g., access levels by the super user, voice commands by the user) in order to set-up the digital voice assistant 200 (e.g., to set-up access levels, to set-up authorization information, etc.) or to provide access to a service from a plurality of services rendered by the digital voice assistant 200. The digital voice assistant 200 may include a speech processing module 204, an access allocation module 206, a storage module 208, a recognition module 210, an authentication module 212, a command processing module 214, and an alerting module 216. As will be appreciated, the digital voice assistant 200 may also include various other modules than those mentioned above so as to perform its function. Further, as will be appreciated by those skilled in the art, all such aforementioned modules 204-216 may be represented as a single module or a combination of different modules. Moreover, as will be appreciated by those skilled in the art, each of the modules 204-216 may reside, in whole or in parts, on one device or multiple devices in communication with each other. Each of the modules 204-216 will be described in greater detail herein below.

As stated above, the user input 202 may correspond to instructions received from one or more users, including a super user, to set-up the digital voice assistant 200 or to access one or more of the plurality of services rendered by the digital voice assistant 200. The user input 202 may also be in form of a voice command or an interaction or a response to an instruction. For example, in a set-up mode of the digital voice assistant 200, the super user may be requested to speak a set of phrases, which may be then provided as the input to the digital voice assistant 200. The digital voice assistant 200 may then generate a unique voice profile corresponding to the user. Further, in the set-up mode, the super user may be requested to create access levels and authorization information. Similarly, in an operational mode, the users may be requested to identify themselves or speak a series of phrases so as to assign them to corresponding access levels or to create their voice profiles. Additionally, in an operation mode, the super user or the user may provide voice command to the digital assistant 200 based on a unique voice directive may be generated. As will be described in detail herein below, the unique voice directive may include voice tags and language tags extracted from the voice command. The user input 202 may be processed by the speech processing module 204.

The speech processing module 204 may be configured to receive the user input (e.g., voice command) from user or the super user. The speech processing module 204 may process the user input 202 in order to extract information (e.g., voice profile, authorization information, voice directives, access levels, general settings, etc.). The speech processing module 204 may then store the extracted information in a database using the storage module 208.

By way of an example, in the set-up mode, the speech processing module 204 may create a voice profile of the super user based on the user input 202. Further, in the set-up mode, the speech processing module 204 may process user input 202 to determine authorization information and determine hierarchical access levels. As stated above, the hierarchical access levels may include, but may not be limited to, a set of service-based access levels (e.g., full access to song rendering services, restricted access to e-commerce services, etc.), a set of role-based access levels (e.g., full access to administrators, somewhat restricted access to managers, more restricted access to guest users, etc.), a relationship-based access levels (e.g., full access to spouse, somewhat restricted access to children, etc.), and/or a set of individual-based access levels (e.g., full access to Jose and Ryan, restricted access to Rich, etc.). It should be noted that the identified super user may enter into the set-up mode to modify or change settings and/or rules for hierarchical access levels even at a later time (e.g., while in the operational mode).

By way of a further example, in the operational mode, the speech processing module 204 may work in conjunction with the recognition module 210 to identify the user (super user or another user). In case of non-identification, the speech processing module 204 establish an identification of the user and create a voice profile of the user based on the user input 202. In an embodiment, the identification may correspond to a unique identity document (ID) generated corresponding to the user in order to uniquely identify the user. The speech processing module 204 may then provide the identification and the voice profile to the user to the access allocation module 206 to map it to one of the hierarchical access levels. Further, in the operational mode, the speech processing module 204 may process user input 202 to generate the unique voice directive corresponding to the voice command. Thereafter, the speech processing module 204 may send the unique voice directive corresponding to the user to the recognition module 210 for further processing. Alternatively, if the unique voice directive is not recognized, the speech processing module 204 may send the unique voice directive access allocation module 206 for allocating appropriate access level. It should be noted that, the speech processing module 204 may employ an artificial intelligence (AI) model to process the user input 202.

The access allocation module 206 may be configured to receive the identification and the voice profile of a user from the speech processing module 204. The access allocation module 206 may then assign one of the hierarchical access levels to the user. Additionally, the access allocation module 206 may be configured to receive the unique voice directive corresponding to a user from the speech processing module 204. The access allocation module 206 may then assign an access level to the unique voice directive. As will be appreciated, the access allocation module 206 may assign the access level from a set of hierarchical access levels based on the input received from the super user. The input received from the super user may include a set of rules with respect to at least one of: one or more of the plurality of services, one or more of the roles, one or more relationship types, and one or more users. Thereafter, the access allocation module 206 may send the identification and the voice profile of the user, the access level assigned the user, and/or the unique voice directive of the user to the storage module 208.

The storage module 208 may be configured to receive and store the information processed by the speech processing module 204 and/or the access allocation module 206. The information may include, but may not be limited to, a user identification of a user, a voice profile of the user, allocated access level to the user, unique voice directives of the user, allocated access level to each of the unique voice directives of the user, and general settings of the digital voice assistant 200. In an embodiment, the storage module 208 may include a database for storing the information. Moreover, the storage module 208 may store device logs, instances of rendering of a restricted service (i.e., instances of an override of a restriction on a user to access one of the plurality of services), instances of failed attempt to access restricted services, and so forth.

The recognition module 210 may be configured to receive the voice sample of a user or the unique voice directive of a user from the speech processing module 204. On receiving the voice sample or the unique voice directive, the recognition module 210 may work in conjunction with the storage module 208 so as to identify the user or the unique voice directive. In particular, to identify the user or the unique voice directive, the recognition module 210 may run a query on the database in the storage module 208. Thereafter, the recognition module 210 may fetch relevant information (e.g., the identification and the access level assigned to the user, or the access level assigned to voice directive) based on the query result. By way of an example, if the user identification is not found, the recognition module 210 may inform the speech processing module 204, which may then work with the access allocation module 206 to establish the identification of the user and to allocate the appropriate access level to the user. Further, if the user is identified, the recognition module 210 may inform the speech processing module 204 of the same. The speech processing module 204 may then interact with the user to receive the voice command and generate voice directive. By way of a further example, if the unique voice directive is identified, the recognition module 210 may send the unique voice directive to the authentication module 212 and/or the command processing module 214 based on the allocated access level to the unique voice directive. Further, if the unique voice directive is not identified, the recognition module 210 may inform the speech processing module 204, which may then work with the access allocation module 206 to allocate the appropriate access level to the unique voice directive based on the identification of the user. The unique voice directive may be then processed based on the allocated access level. Additionally, if the unique voice directive has a restricted access level (i.e., if the unique voice directive corresponds to voice command to render the restricted service), the speech processing module 204 may request the user for the authorization information (i.e., authorization information to override the restricted access).

The authentication module 212 may be configured to receive the unique voice directive corresponding to the restricted service and the authorization information from the recognition module 210. The authentication module 212 may then work in conjunction with the storage module 208 to verify the authorization information provided by the user. As will be appreciated, the verification of the authorization information may result in rendering of the restricted service based on the unique voice directive. Thus, upon the verification of the authorization information provided by the user, the authentication module 212 may send the unique voice directive to the command processing module 214 for rendering of the restricted service. However, if the authentication module 212 is unable to verify the authorization information (i.e., the verification fails), the authentication module 212 may inform the user of the same. Further, the authentication module 212 may send a trigger to the alerting module 216, which may then inform the super user of an attempt to access the restricted service by the user and whether the attempt was successful or not.

The command processing module 214 may be configured to receive the unique voice directive from the recognition module 210 (in case of non-restricted access level) or the authentication module 212 (in case of restricted access level). On receiving the unique voice directive, the command processing module 214 may process the unique voice directive in order to render the service. As stated above, the rendering of the service may be based on the allowed access level of the unique voice directive or the authorization information. Further, the command processing module 214 may provide information of such rendering of the service to the alerting module 216, which may create a log of such rendering.

The alerting module 216 may be configured to receive information from the authentication module 212 (with respect to success or unsuccessful authorization) and/or from the command processing module 214 (with respect to the rendering of the service). Additionally, in an embodiment, the alerting module 216 may receive information from other modules such as the speech recognition module 204, access allocation module 206, and recognition module 210. Based on the information received, the alerting module 216 may either create a device log for subsequent rendering to the super user or may prepare an alert/notification for the super user with respect to an attempt to access restricted service, rendering of the restricted service based on the override authorization information, and so forth. In one embodiment, the alerting module 216 may send the alert/notification on a device of the super user (e.g., one of the external devices 116). By way of an example, if a child gives a unique voice directive to the digital voice assistant 200 to order a toy from a ecommerce website, the alerting module 216 may notify the super user (e.g., father of the child) on his mobile phone regarding the unique voice directive given by the child.

It should be noted that the digital voice assistant 200 may be implemented in programmable hardware devices such as programmable gate arrays, programmable array logic, programmable logic devices, or the like. Alternatively, the digital voice assistant 200 may be implemented in software for execution by various types of processors. An identified engine/module of executable code may, for instance, include one or more physical or logical blocks of computer instructions which may, for instance, be organized as an object, procedure, function, or other construct. Nevertheless, the executables of an identified engine/module need not be physically located together but may include disparate instructions stored in different locations which, when joined logically together, comprise the identified engine/module and achieve the stated purpose of the identified engine/module. Indeed, an engine or a module of executable code may be a single instruction, or many instructions, and may even be distributed over several different code segments, among different applications, and across several memory devices.

As will be appreciated by one skilled in the art, a variety of processes may be employed for providing secured access to services rendered by a digital voice assistant device 102. For example, the exemplary system 100 and an associated digital voice assistant device 102 may manage secured access to the services rendered by the digital voice assistant device 102, by the process discussed herein. In particular, as will be appreciated by those of ordinary skill in the art, control logic and/or automated routines for performing the techniques and steps described herein may be implemented by the system 100 and the associated digital voice assistant device 102 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all the processes described herein may be included in the one or more processors on the system 100.

Figure 3:
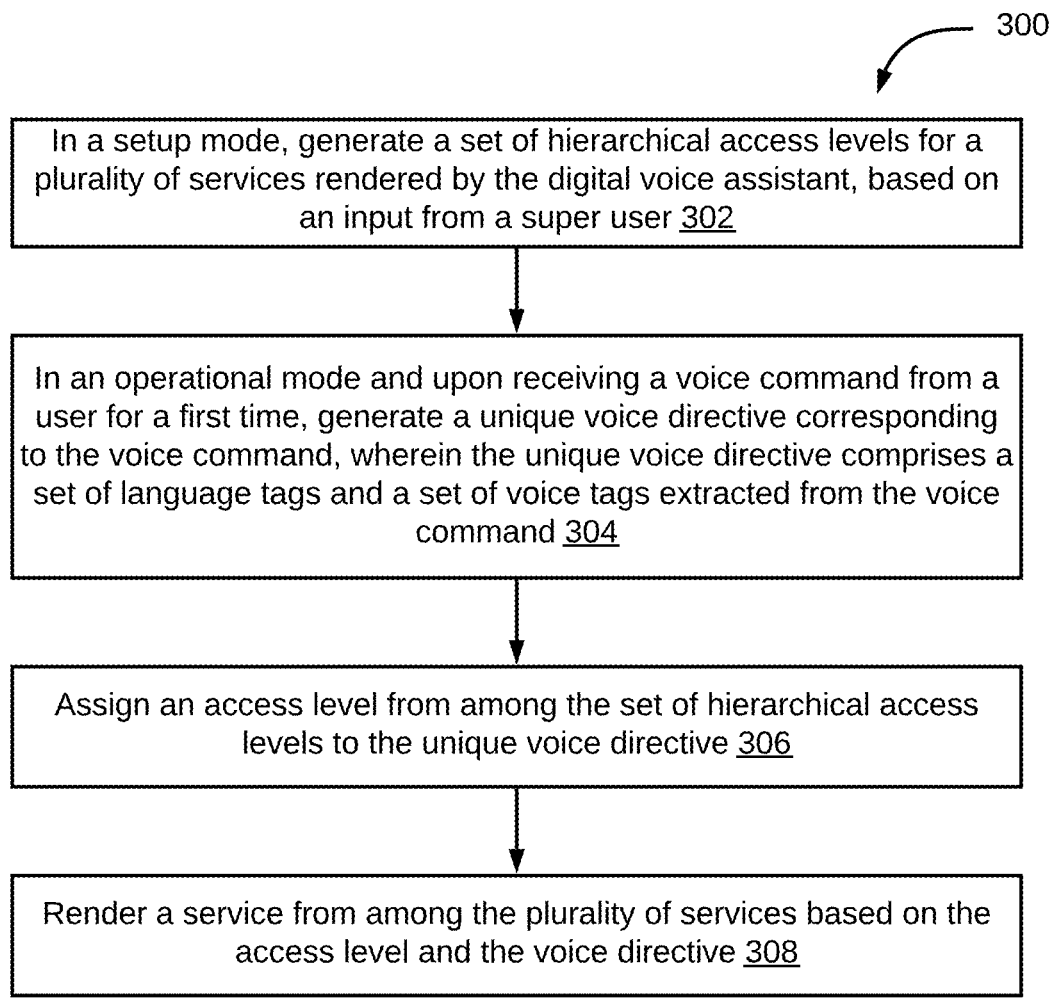
FIG. 3 is a flow diagram of an exemplary process for providing secured access to services rendered by a digital voice assistant, in accordance with some embodiments of the present disclosure.

Referring now to FIG. 3, an exemplary process 300 for providing secured access to services rendered by a digital voice assistant device 102 is depicted via flowchart, in accordance with some embodiments of the present disclosure. At step 302, the digital voice assistant device 102 may generate a set of hierarchical access levels for a plurality of services rendered by the digital voice assistant device 102, based on an input from a super user. The set of hierarchical access levels may be generated at a time of set-up (i.e., in a set-up mode) of the digital voice assistant device 102. In an embodiment, the input from the super user may comprise a set of rules with respect to at least one of: one or more of the plurality of services, and one or more users. Further, in an embodiment, the set of hierarchical access level may include, but is not limited to at least one of a set of service-based access levels, a set of role-based access levels, a relationship-based access levels, and a set of individual-based access levels.

Thereafter, in an operational mode of the digital voice assistant device 102, at step 304, upon receiving a voice command from a user for a first time, the digital voice assistant device 102 may generate a unique voice directive corresponding to the voice command. The unique voice directive may comprise a set of language tags and a set of voice tags extracted from the voice command. It an embodiment, the set of voice tags may be generated based on the voice command received from each of the one or more user. By way of an example, in order to generate and register the set of voice tags, the user may be made to speak a particular phrase ten times. Moreover, with the help of each of the set of voice tags, a voice customized for a specific language may be selected, thereby ensuring that a language of tagged text (corresponding to the voice tag) match the language attributes of the language of the text (i.e., voice).

Upon generating the unique voice directive, at step 306, the digital voice assistant device 102 may assign an access level from among the set of hierarchical access level to the unique voice directive. In an embodiment, in order to assign the access level, the digital voice assistant device 102 may establish an identification of the user based on an input from the user. In an embodiment, the input received from the user may include the unique voice directive. Further, the digital voice assistant device 102 may determine one or more access levels from the set of hierarchical access levels for one or more of the plurality of services to be rendered to the user, based on the identification of the user. Further, the digital voice assistant device 102 may identify a service based on the unique voice directive. Thereafter, the digital voice assistant device 102 may assign the access level to the unique voice directive may be assigned based on the service and the one or more access levels for the one or more of the plurality of services. Moreover, the digital voice assistant device 102 may update a database with the identification of the user, the unique voice directive provided by the user, the associated service corresponding to the unique voice directive, and the access level for the instant use as well as for a subsequent use.

Upon assigning the access level, at step 308, the digital voice assistant device 102 may render the service from among the plurality of services to the user based on the access level and the unique voice directive. Moreover, in an embodiment, the digital voice assistant device 102 may render the service based on the voice directive and an override authorization information. It should be noted that, in an embodiment, the override authorization information may be generated by the super user in the set-up mode. Additionally, it should be noted that the override authorization information may be configured to override a restriction imposed on the service based on the access level of the user. Further, in an embodiment, the digital voice assistant device 102 may notify the super user about a rendering of the service based on the override authorization information. In such embodiment, the super user may override restrictions imposed by him/her and may grant temporary access to the user in order to access restricted services for a defined period of time.

Figure 4:
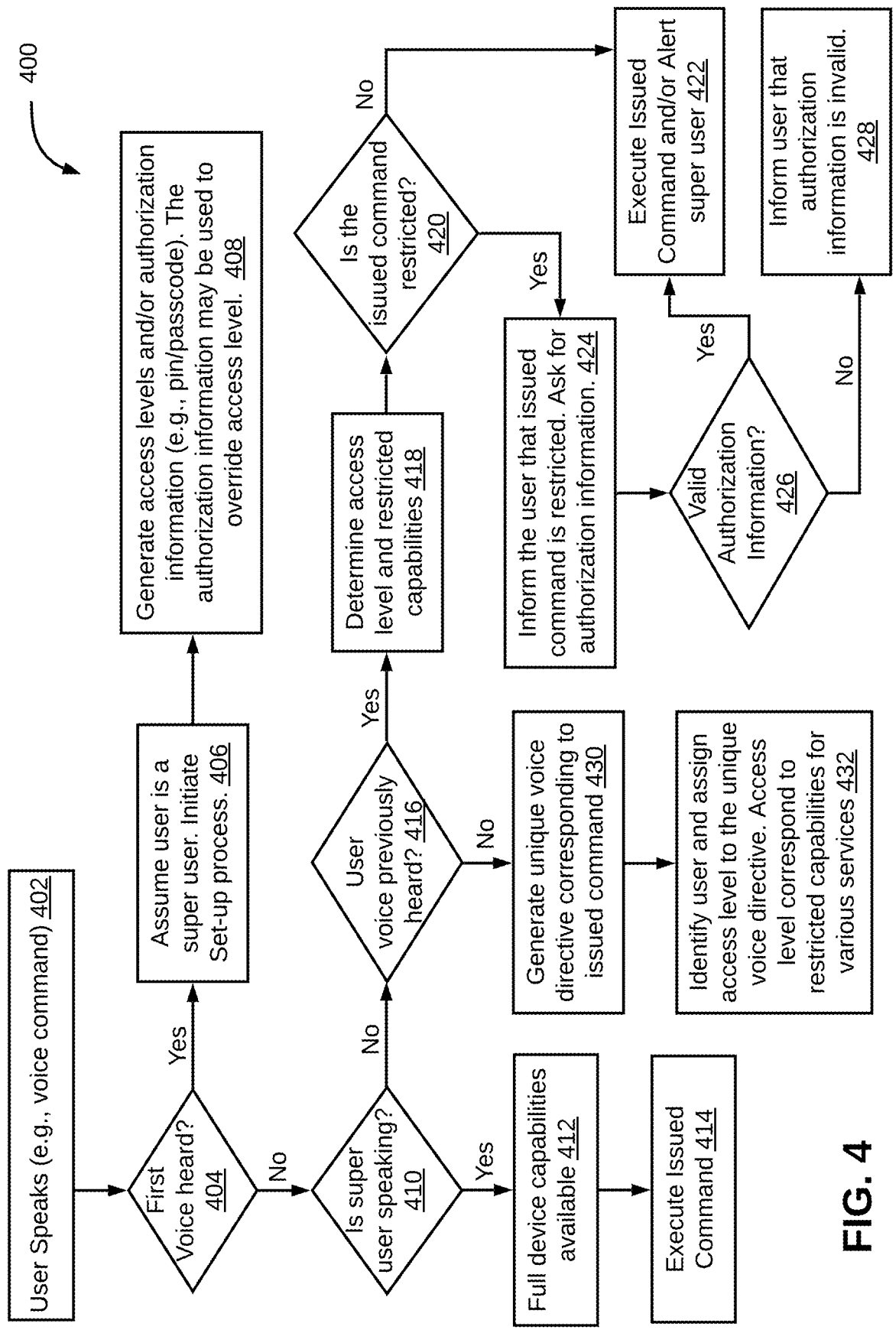
FIG. 4 is a flow diagram of a detailed exemplary process for providing secured access to services rendered by a digital voice assistant, in accordance with some embodiments of the present disclosure.

Referring now to FIG. 4, a process 400 for providing secured access to services rendered by a digital voice assistant device 102 is depicted in greater detail via a flow diagram, in accordance with some embodiments of the present disclosure. At step 402, a user may speak to the digital voice assistant device 102 (e.g., a voice command, speak as per instruction, etc.). For example, in an embodiment, the user may speak a set of phrases in order to create a voice profile corresponding to the user. In an embodiment, the creation of the voice profile may be associated with an identification established for the user. It should be noted that, in an embodiment, the voice profile created may not only work with the digital voice assistant device 102 and across various other third-party devices that are enabled with same digital voice assistant 200. At step 404, the digital voice assistant device 102 may perform a check to determine whether the voice heard is a first heard voice or not. Further, based on an affirmative check at step 404 (i.e., when the voice heard is the first heard voice), at step 406, the digital voice assistant device 102 may determine that the user is a super user. The digital voice assistant device 102 may, therefore, initiate a set-up process. Further, at step 408, the digital voice assistant device 102 may interact with the user to generate the hierarchical access levels and the authorization information as a part of the set-up process. It should be noted that, in an embodiment, the authorization information may include a pin or a passcode. Further, it should be noted that the authorization information may be used by a user (other than the super user) to override the restricted access level.

In an embodiment, once a profile of the super user is created, the digital voice assistant device 102 may learn voice samples of the super user in order to deliver more personalized experience. Moreover, the super user may have ability to give any command to the digital voice assistant device 102 without any restriction to any of the services that can be rendered by the super user. Also, the super user may have ability to restrict rendering of certain services to other users by creating access levels and preventing their commands from being acknowledged and executed by the digital voice assistant device 102. Further, the super user may access a list of voice samples to identify one or more users that have been using or attempting to use the digital voice assistant device 102. In addition, the super user may select a set of new rules that may be applied to one or more users. Also, the super user may assign a name (i.e., the identification) to each voice sample to further simplify setting up rules for one or more users in future. Additionally, the super user may be notified via their mobile device (or any device from the external devices 116) when a restricted command may be attempted by a user.

Further, based on a negative check at step 404 (i.e., when the voice heard is not the first heard voice), at step 410, the digital voice assistant device 102 may perform a check to identify whether the super user is speaking or not. Based on an affirmative check at step 410 (i.e., if the person speaking is the super user), at step 412, the digital voice assistant device 102 may make available its full capabilities to the super user. In an embodiment, the full capabilities may correspond to unrestricted access to the plurality of services rendered by the digital voice assistant device 102. Thus, at step 414, the digital voice assistant device 102 may execute the unique voice directive corresponding to the voice command received from the super user so to render the service corresponding to the voice command. Moreover, in an embodiment, the voice command received from the super user may be prioritized over any other voice command issued contemporaneously. In such embodiment, the voice commands from other users may be dropped or kept in queue for subsequent processing by the digital voice assistant device 102.

Further, based on a negative check at step 410 (i.e., if the person speaking is not the super user), at step 416, the digital voice assistant device 102 may perform a check to determine whether the user voice is previously heard or not. Further, based on an affirmative check at step 416 (i.e., when the user voice has been previously heard by the digital voice assistant device 102), at step 418, the digital voice assistant device 102 may determine access level of the user based on an identification of the user. The digital voice assistant device 102 may then make available restricted capabilities to the user based on the access level of the user. It should be noted that the restricted capabilities may correspond to restricted access to some or all of the plurality of services rendered by the digital voice assistant device 102. In other words, the normal user may have permission to access only those services that have not been restricted by the super user. Further, at step 420, the digital voice assistant device 102 may perform a check to determine whether the voice command issued by the user is restricted or not. In particular, the digital voice assistant device 102 may perform a check to determine whether the unique voice directive corresponding to the voice command issued by the user is restricted or not. Thereafter, based on a negative check at step 420 (i.e., if the issued command is not restricted), at step 422, the digital voice assistant device 102 may execute the unique voice directive corresponding to the voice command. Additionally, in an embodiment, the digital voice assistant device 102 may send an alert to the super user regarding the rendering of the service to the user.

However, based on an affirmative check at step 420 (i.e., if the issued command is restricted), at step 424, the digital voice assistant device 102 may inform the user of the same and may request the user to provide the override authorization information (e.g., pin or passcode set-up by the super user at step 408). Further, at step 426, the digital voice assistant device 102 may perform a check to determine whether the authorization information provided by the user is valid or not. Based on an affirmative check at step 426 (i.e., if the authorization information is valid), at step 422, the digital voice assistant device 102 may execute the unique voice directive corresponding to the voice command. Additionally, the digital voice assistant device 102 may send an alert to the super user regarding the rendering of the service to the user based on the override authorization information. However, based on a negative check at step 426 (i.e., if the authorization information is not valid), at step 428, the digital voice assistant device 102 may inform the user of the same. Moreover, in an embodiment, a count check may be performed on number of attempts to provide the authorization information so as to take appropriate action. For example, when the user enters the wrong pin/password more than three times in order to access the service that has been restricted by the super user, then that particular service may be blocked for the user or the user himself may be blocked from accessing any service.

Further, based on a negative check at step 416 (i.e., when the user voice has not been previously heard by the digital voice assistant device 102), at step 430, the digital voice assistant device 102 may generate a unique voice directive corresponding to the voice command issued by the user. At step 432, the digital voice assistant device 102 may further identify the user and assign an access level to the user and/or the unique voice directive. As stated above, the access levels may be from the hierarchical access levels set-up by the super user and may correspond to restricted capabilities for various services rendered by the digital voice assistant device 102.

By way of an example, the super user may correspond to a head of a family or an organization. Example of the super user may include, but is not limited to, a parent, a spouse, an administrator, or an owner of a retail super store. The head of the family or the organization may have access to full capabilities (i.e., services) rendered by the digital voice assistant device 102. Moreover, the super user may restrict access to one or more services rendered by the digital voice assistant device 102 to one or more users (also referred as the normal users or simply the users). Example of normal user may include, but is not limited to, other family member, guest visiting the house, or employees working in the retail store. The one or more user may access only those services, rendered by the digital voice assistant device 102, that have been allowed by the super user.

An applicability of proposed invention in the present disclosure is explained via an example. Consider a scenario where two persons 'A' and 'B' share a flat together. Suppose a person 'A' sets a reminder for 5 PM tomorrow for an online meeting using a digital voice assistant. Now, there won't be any way for a person 'B' to delete the reminder (intentionally or unintentionally) without an approval of the person 'A'. Moreover, if the reminder set by the person 'A' was for a significant event, then person A would be adversely impacted if the reminder were cancelled. Similarly, the parent may restrict their children from online shopping using the digital voice assistant. As will be appreciated, the digital voice assistant may implement the restrict on such service based on the pre-configured rule set and the voice recognition.

Various embodiments provide method and system for providing secured access to services rendered by the digital voice assistant. In particular, the disclosed method and system, described in various embodiments discussed above, may allow the user of the digital voice assistant device to restrict access to various voice-based services provide by the digital voice assistant device by setting hierarchical access levels and authorization to override the assigned access level (if required).

In some embodiments, the disclosed method and system may help to generate a set of hierarchical access levels for a plurality of services rendered by the digital voice assistant, based on an input from a super user, in a set up mode. Further, in an operational mode and upon receiving a voice command from a user for a first time, the disclosed method and system may generate a unique voice directive corresponding to the voice command. Further, the disclosed method and system may assign an access level from among the set of hierarchical access levels to the unique voice directive. The disclosed method and system may then render a service from among the plurality of services based on the access level and the voice directive.

The disclosed method and system provide some advantages like enhanced and efficient interaction model. In addition, the disclosed method and system may be integrated with any digital voice assistant-enabled third-party devices. Further, the disclosed method and system may allow for overriding of any restrictions imposed on the digital voice assistant on receiving authorization information set-up by the super user. In addition, the disclosed method and system rely upon a Speech Synthesis Markup Language (SSML) in an output speech of the super user response in order to control how the digital voice assistant may generate speech. The SSML may be primarily used in order to manipulate and process pauses and other significant speech effects.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for providing secured access to services rendered by a digital voice assistant, the method comprising:
   in a set-up mode, generating, by the digital voice assistant, a set of hierarchical access levels for a plurality of services rendered by the digital voice assistant, based on an input from a super user;
   in an operational mode and upon receiving a voice command from a user for a first time,
   generating, by the digital voice assistant, a unique voice directive corresponding to the voice command, wherein the unique voice directive comprises a set of language tags and a set of voice tags extracted from the voice command;
   assigning, by the digital voice assistant, an access level from among the set of hierarchical access levels to the unique voice directive;
   rendering, by the digital voice assistant, a service from among the plurality of services based on the access level and the unique voice directive, and
   updating, by the digital voice assistant, a database with the user, the unique voice directive, the service, and the access level for a subsequent use.

2. The method of claim 1, wherein the input from the super user comprises a set of rules with respect to at least one of: one or more of the plurality of services, and one or more users.

3. The method of claim 1, wherein the set of hierarchical access levels comprises at least one of a set of service-based access levels, a set of role-based access levels, a relationship-based access levels, and a set of individual-based access levels.

4. The method of claim 1, wherein assigning the access level further comprises:
 establishing, by the digital voice assistant, an identification of the user based on an input from the user, wherein the input comprises the unique voice directive;
 determining, by the digital voice assistant, one or more access levels from the set of hierarchical access levels for one or more of the plurality of services to the user, based on the identification of the user;
 identifying, by the digital voice assistant, the service based on the unique voice directive; and
 assigning, by the digital voice assistant, the access level to the unique voice directive based on the service and the one or more access levels for the one or more of the plurality of services.

5. The method of claim 1, wherein rendering the service further comprises rendering the service based on the unique voice directive and an override authorization information, wherein the override authorization information is generated by the super user in the set-up mode and is configured to override a restriction imposed on the service based on the access level.

6. The method of claim 5, further comprising notifying the super user about the rendering of the service based on the override authorization information.

7. A digital voice assistant device, comprising:
 a processor; and
 a memory communicatively coupled to the processor, wherein the memory stores processor executable instructions, which, on execution, causes the processor to:
  in a set-up mode, generate a set of hierarchical access levels for a plurality of services rendered by the digital voice assistant device, based on an input from a super user;
  in an operational mode and upon receiving a voice command from a user for a first time,
   generate a unique voice directive corresponding to the voice command, wherein the unique voice directive comprises a set of language tags and a set of voice tags extracted from the voice command;
   assign an access level from among the set of hierarchical access levels to the unique voice directive;
   render a service from among the plurality of services based on the access level and the unique voice directive; and
   update a database with the user, the unique voice directive, the service, and the access level for a subsequent use.

8. The digital voice assistant device of claim 7, wherein the input from the super user comprises a set of rules with respect to at least one of: one or more of the plurality of services, and one or more users.

9. The digital voice assistant device of claim 7, wherein the set of hierarchical access levels comprises at least one of a set of service-based access levels, a set of role-based access levels, a relationship-based access levels, and a set of individual-based access levels.

10. The digital voice assistant device of claim 7, wherein the processor executable instructions cause the processor to assign the access level by:
 establishing an identification of the user based on an input from the user, wherein the input comprises the unique voice directive;
 determining one or more access levels from the set of hierarchical access levels for one or more of the plurality of services to the user, based on the identification of the user;
 identifying the service based on the unique voice directive; and
 assigning the access level to the unique voice directive based on the service and the one or more access levels for the one or more of the plurality of services.

11. The digital voice assistant device of claim 7, wherein the processor executable instructions cause the processor to render the service by rendering the service based on the unique voice directive and an override authorization information, wherein the override authorization information is generated by the super user in the set-up mode and is configured to override a restriction imposed on the service based on the access level.

12. The digital voice assistant device of claim 11, wherein the processor executable instructions further cause the processor to notify the super user about the rendering of the service based on the override authorization information.

13. A non-transitory computer-readable medium storing computer-executable instructions for providing secured access to services rendered by a digital voice assistant, the stored computer-executable instructions, when executed by a processor, cause the processor to perform operations comprising:
 in a set-up mode, generating a set of hierarchical access levels for a plurality of services rendered by the digital voice assistant, based on an input from a super user;
 in an operational mode and upon receiving a voice command from a user for a first time,
  generating a unique voice directive corresponding to the voice command, wherein the unique voice directive comprises a set of language tags and a set of voice tags extracted from the voice command;
  assigning an access level from among the set of hierarchical access levels to the unique voice directive;
  rendering a service from among the plurality of services based on the access level and the unique voice directive; and
  updating a database with the user, the unique voice directive, the service, and the access level for a subsequent use.

\* \* \* \* \*